Patented Mar. 16, 1937

2,073,797

UNITED STATES PATENT OFFICE 2,073,797

MANUFACTURE OF GLYCERIDES OF FATTY ACIDS

Thomas Percy Hilditch, Brownlow Hill, Liverpool, and John Gordon Rigg, Wallasey, England, assignors to Imperial Chemical Industries Limited, a corporation of Great Britain No Drawing. Application June 21, 1935, Serial No. 27,812. In Great Britain July 2, 1934

17 Claims. (Cl. 87—12)

This invention relates to the production of monoglycerides, or of mixtures of glycerides rich in monoglycerides, by direct esterification of a fatty acid, or a mixture of fatty acids, with glycerol. More particularly, this invention relates to new processes for producing monoglycerides of monocarboxylic aliphatic acids having chains of from twelve to eighteen carbon atoms.

It is well known that fatty acids and glycerol may be combined together to form glycerides by heating them together at a fairly high temperature and under a vacuum or in a stream of inert gas to facilitate the removal of the water produced in the course of esterification. It is also known that the esterification may be accelerated (or, alternatively, carried on at a lower temperature) if small proportions (0.3–0.5%) of an aromatic sulphonic acid such as naphthalene beta sulphonic acid are present in the reacting mixture. The products of a direct esterification of this kind are usually mixtures of tri-, di- and monoglycerides in which the tri- and diglycerides usually predominate, or, under suitable conditions, almost complete production of triglycerides may be effected. It is not, however, possible to produce in this way, even when a large excess of glycerol is used, a product which shall contain a high proportion (above about 40–45%) of monoglycerides. The low yield of monoglycerides, or, rather, the preferred formation of di- and/or triglycerides, which characterizes these previously known processes, is, we find, due to the sparing miscibility of fatty acids and glycerides with glycerol, and especially to the preferential solution of the monoglycerides first formed in the fatty acid rather than in the glycerol phase.

This invention has as an object the provision of novel and easily conducted processes whereby compositions containing high proportions of monoglycerides may be cheaply produced. A further object is to provide processes for producing monoglycerides which shall reduce to a minimum the amount of di- and triglycerides which are concomitantly formed as by-products. A still further object is to provide cheap processes for obtaining monoglycerides in a fairly high state of purity. Another object is to provide suitable solvent mediums in which the esterification of glycerol with fatty acids may take place. Another object is to promote the production of monoglycerides by maintaining a proper ratio between the amounts of glycerol and fatty acid employed in the reaction mixture. Another object is to maintain optimum temperature conditions for suitable lengths of time while esterification is being carried out so that the production of high yields of monoglycerides of high purity may be favored. Another object is to provide suitable novel catalysts which will accelerate the esterification of glycerol by fatty acids and improve the properties of the products thereby obtained. Another object is to provide suitable novel catalysts which when used in smaller proportions are as effective as catalysts which have heretofore been used. Other objects will appear hereinafter.

These objects are accomplished by the following invention according to which products containing about 80% or more of monoglycerides are readily obtained by esterifying glycerol with fatty acids in a suitable solvent medium. The invention is characterized by the choice of such proportions of reactants and reaction temperatures that the formation of high yields of fairly pure monoglycerides will be favored. The invention is further characterized by the employment of novel esterification catalysts.

In order that the invention may be more concretely illustrated, a few specific examples will be set forth, after which, a few of the modifications, substitutions, variations, and equivalents as fall within the scope of the invention will be mentioned.

The following examples in which parts are by weight illustrate but do not limit the invention.

Example 1

20 parts of stearic acid, 20 parts of glycerol and 20 parts of phenol, with 0.02 part of camphor beta sulphonic acid, are heated at 160° C. for 4 hours. The phenol is removed by distillation in a current of steam (or in a vacuum), and the residue is washed with alkali to remove unchanged stearic acid. There are obtained 20 parts of product. This melts at 68.5–69° C., and contains about 79% of monostearin.

Example 2

20 parts of oleic acid, 20 parts of glycerol and 20 parts of phenol, with 0.02 part of camphor beta sulphonic acid, are heated at 160° C. for 4 hours. After further treatment as described in Example 1, 18.9 parts of product are obtained. This has M. P. 22° C., and contains about 85% of mono-olein.

Example 3

20 parts of palmitic acid, 72 parts of glycerol and 20 parts of phenol, with 0.02 part of camphor beta sulphonic acid, are heated at 160° C. for 4 hours. After further treatment as in Example 1, 17.9 parts of product of M. P. 66.5° C., containing about 93% of monopalmitin, are obtained.

Example 4

20 parts of lauric acid, 92 parts of glycerol, and 20 parts of phenol are heated (without camphor beta sulphonic acid or other catalyst) at 180° C. for 1 hour. After further treatment as in Example 1, 6.1 parts of product, M. P. 55–55.5° C. containing 98% of monolaurin, are obtained.

Example 5

20 parts of oleic acid, 20 parts of glycerol, and 20 parts of phenol, with 0.02 part of camphor beta sulphonic acid, are heated at 140° C. for 4 hours. After further treatment as in Example 1, 10.7 parts of product M. P. 22.5–23° C. containing about 90% of mono-olein, are obtained.

Example 6

20 parts of lauric acid, 20 parts of phenol, 28 parts of glycerol and 0.1 part of camphor-β-sulphonic acid are heated together at 160° C. for 4 hours. After further treatment as in Example 1, 20.7 parts of product, M. P. 53–53.5° C., containing 84 to 88% of monolaurin are obtained. At a temperature of 120° and using only 0.02 part of catalyst there are obtained only 16.1 parts of a very similar product, M. P. 53.5–54° C.

Example 7

20 parts of stearic acid, 20 parts of glycerol, 0.1 part of camphor-β-sulphonic acid and 20 parts of p-cresol are heated together at 160° for 4 hours. The p-cresol is then removed by distillation in steam and the product further worked up as in Example 1.
Yield: 18.7 grams.
Saponification equivalent 333.7 corresponding to a monoglyceride content at 84.4 to 88.9%.

The first two of the examples given above represent the conditions preferred for giving a high yield with relatively high content of monoglycerides; the other examples illustrate the effect of variations in the time, temperature, proportion of glycerol and/or presence or absence of catalyst.

While the employment of a solvent is the chief feature of the present invention, we also, of course, utilize other conditions which will favor the production of monoglycerides rather than of di- or triglycerides. Other conditions which are deliberately controlled in order to increase the yield and purity of the products comprise, (a) the relative amounts of glycerol used in the reaction mixture, (b) the temperature of the reaction and (c) the duration of the period of heating.

We prefer to employ an excess of glycerol above that indicated by the equation:

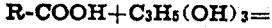
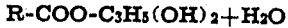

$$R\text{-}COOH + C_3H_5(OH)_3 = R\text{-}COO\text{-}C_3H_5(OH)_2 + H_2O$$

As Examples 1 and 2 show, we prefer to use an amount of glycerol which is equal in weight to the amount of the higher fatty acid employed in the reaction mixture. However, as Examples 3 and 4 show, a relatively larger amount of glycerol may be employed. In general, it will be found advisable to use from 15 to 100 parts of glycerol for every 20 parts of a monocarboxylic aliphatic acid having a chain of from twelve to eighteen carbon atoms. Broadly speaking, the use of lower proportions of glycerol gives larger yields of product (which, however, contain lower proportions of monoglycerides) than the use of higher proportions of glycerol.

The temperature of reaction may be varied between about 180° C. and 120° C. according to the yield and desired monoglyceride content of the product. As Examples 1 to 3 show, the preferred temperature of reaction is 160° C. Broadly speaking, the use of the higher temperatures gives larger yields of product (which, however, contain lower proportions of monoglycerides) than the use of lower temperatures.

Similarly, the reaction is effected by time of heating, a longer time giving a higher yield of product, which, however, may contain somewhat less monoglyceride than that obtained in smaller yield by treatment for a shorter time. While the duration of the period of heating will generally range between ½ and 8 hours and more usually lie between 1 and 4 hours, it is preferable, as shown by the examples given above, to fix the duration of the reaction period at about 4 hours.

Another important feature of our invention which is involved in the examples given above is the use of novel esterification catalysts. We have found that a hydroaromatic sulphonic acid, viz. Reychler's camphor beta sulphonic acid, is superior to the aromatic sulphonic acids hitherto used as esterification catalysts in that much less (0.1% as against 0.5% of aromatic sulphonic acid) is needed; moreover, there is less tendency for the product to be discolored. The presence of camphor beta sulphonic acid has a marked effect on the yield, that is on the extent to which esterification proceeds. At the same time, the proportion of monoglyceride present in the product is usually slightly less when the catalyst is used than when it is not.

A suitable solvent for the purpose of the present invention is one which, in the first place, dissolves both glycerol and higher fatty acids with ease; and which, secondly, is readily and conveniently removed at the end of the operation; in addition, of course, it is desirable that its boiling-point should lie above the temperature of the esterification. We have found that phenols meet all these conditions satisfactorily, and the principal embodiment of the invention accordingly comprises an esterification of glycerol with a fatty acid in a phenolic medium. As the above examples show, common phenol is the preferred solvent. In place of common phenol, other monohydric mononuclear phenols such as the cresols, the xylenols, or mixtures such as commercial cresylic acid may be used.

The use of other fatty acids in place of stearic acid, oleic acid, palmitic acid, and lauric acid is contemplated. In general, the use of a monocarboxylic aliphatic acid having a chain of from twelve to eighteen carbon atoms is preferred. Other fatty acids which may be employed for preparing these glycerides include capric acid, undecylic acid, myristic acid, arachidic acid, hypogaeic acid, elaidic acid, behenic acid, erucic acid, linoleic acid, and linolenic acid. It is also contemplated that suitable mixtures of these fatty acids may be employed for preparing these glycerides. A convenient way of obtaining such mixtures of fatty acids is by hydrolyzing suitable fats and oils. Such fats and oils as coconut oil, palm oil, tallow, sperm oil, olive oil, palm kernel oil, and linseed oil upon hydrolysis yield mixtures of fatty acids which can be used in place of stearic acid, etc., in carrying out the processes of the present invention. The use of mixtures of acids obtained in this manner is often found to be desirable on account of the fact that such acid mixtures may frequently be obtained at lower cost than a pure acid such as stearic acid.

The monoglycerides of fatty acids are technically important. Those in which the fatty acid radicals are those of saturated fatty acids are useful intermediates for making textile assistants, especially detergents. Those in which the fatty acid radicals are those of drying-oil acids are useful in the manufacture of paints and varnishes, especially, when they are further treated with polybasic acids or their anhydrides, e. g. phthalic anhydride.

Our invention presents several distinct advantages over the methods of the prior art which may be briefly recapitulated at this point. While it was generally impossible according to prior art methods to produce compositions containing more than 40–45% of monoglycerides by esterifying glycerol with fatty acids, it is now possible according to the methods of our invention to easily obtain compositions which contain more than 70% of monoglycerides. As the above examples show, products containing about 80% or more of monoglycerides are usually obtained by our methods. Since our methods reduce to a minimum the amount of di- and triglycerides which are concomitantly produced as by-products, we are enabled to obtain purer monoglyceride compositions than those which were made by known processes of esterifying glycerol with fatty acids. Furthermore, the novel catalyst which we use is more effective per unit of weight than the aromatic sulphonic acids which were previously employed. Our novel catalyst also lessens the tendency for the product to be discolored.

As many apparently widely different embodiments of this invention may be made without widely departing from the spirit and scope thereof, it is to be understood that the invention is not limited to the specific embodiments thereof except as defined in the appended claims.

We claim:

1. The process of producing esters containing a high proportion of monoglycerides which comprises esterifying glycerol with one or more fatty acids in a solvent medium composed of one or more monohydric mononuclear phenols.

2. The process according to claim 1 in which a small amount of a hydroaromatic sulphonic acid is used as an esterification catalyst.

3. The process of producing esters containing a predominant proportion of monoglycerides of one or more of the higher fatty acids which comprises heating an excess of glycerol with one or more monocarboxylic aliphatic acids containing chains of twelve or more carbon atoms in a solvent medium composed of one or more monohydric mononuclear phenols.

4. The process according to claim 3 in which a small amount of a hydroaromatic sulphonic acid is used as an esterification catalyst.

5. The process of producing a mixture of glycerides which contains more than 70% of a monoglyceride of a monocarboxylic aliphatic acid having a chain of from twelve to eighteen carbon atoms which comprises heating a phenol solution containing a monocarboxylic aliphatic acid having a chain of from twelve to eighteen carbon atoms and an excess of glycerol at temperatures between 120° C. and 180° C. for from ½ to 8 hours, removing the phenol by distillation, and washing the residue with an alkali to remove unreacted aliphatic acid.

6. The process according to claim 5 in which camphor beta sulphonic acid is employed as an esterification catalyst.

7. The process of producing a mixture of glycerides which contains more than 70% of a monoglyceride of a monocarboxylic aliphatic acid having a chain of from twelve to eighteen carbon atoms which comprises heating a solution containing 20 parts of phenol, 15 to 100 parts of glycerol, and 20 parts of a monocarboxylic aliphatic acid having a chain of from twelve to eighteen carbon atoms at temperatures between 120° C. and 180° C. for from 1 to 4 hours; removing the phenol by distillation; and washing the residue with alkali to remove unchanged aliphatic acid.

8. The process according to claim 7 in which a small amount of a hydroaromatic sulphonic acid is used as an esterification catalyst.

9. The process according to claim 7 in which a small amount of camphor beta sulphonic acid is used as an esterification catalyst.

10. The process of producing a mixture of glycerides which contains more than 70% of monostearin which comprises heating 20 parts of stearic acid, 20 parts of glycerol, and 20 parts of phenol with 0.02 part of camphor beta sulphonic acid at 160° C. for 4 hours; removing the phenol by distillation in a current of steam, and washing the residue with alkali.

11. The process of producing a mixture of glycerides which contains more than 70% of monoolein which comprises heating 20 parts of oleic acid, 20 parts of glycerol, and 20 parts of phenol with 0.02 part of camphor beta sulphonic acid at 160° C. for 4 hours; removing the phenol by distillation in a current of steam, and washing the residue with alkali.

12. The process of producing a mixture of glycerides which contains more than 70% of monopalmitin which comprises heating 20 parts of palmitic acid, 72 parts of glycerol, and 20 parts of phenol with 0.02 part of camphor beta sulphonic acid at 160° C. for 4 hours; removing the phenol by distillation, and washing the residue with alkali.

13. The process of producing glycerides which comprises heating glycerol with one or more fatty acids in the presence of a hydroaromatic sulphonic acid.

14. The process of claim 13 in which the reaction takes place in a common solvent of glycerol and fatty acids.

15. The process of producing glycerides containing high proportions of monoglycerides of one or more of the higher fatty acids which comprises heating an excess of glycerol with one or more monocarboxylic aliphatic acids containing chains of twelve or more carbon atoms in the presence of camphor beta sulphonic acid.

16. The process according to claim 15 in which the reaction takes place in a common solvent of glycerol and higher fatty acids.

17. The process of producing glycerides which comprises heating glycerol with one or more fatty acids in the presence of camphor beta sulphonic acid.

THOMAS PERCY HILDITCH.
JOHN GORDON RIGG.